(12) United States Patent
Gasteyer, III et al.

(10) Patent No.: US 11,350,650 B2
(45) Date of Patent: Jun. 7, 2022

(54) HELICAL DEVICE FOR COOLING OR HEATING

(71) Applicants: Theodore H Gasteyer, III, Naperville, IL (US); Yeu-Chuan Simon Ho, Naperville, IL (US)

(72) Inventors: Theodore H Gasteyer, III, Naperville, IL (US); Yeu-Chuan Simon Ho, Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 199 days.

(21) Appl. No.: 16/430,567

(22) Filed: Jun. 4, 2019

(65) Prior Publication Data

US 2019/0373924 A1 Dec. 12, 2019

Related U.S. Application Data

(60) Provisional application No. 62/683,301, filed on Jun. 11, 2018.

(51) Int. Cl.
| | |
|---|---|
| *A23L 3/36* | (2006.01) |
| *A23L 5/10* | (2016.01) |
| *A47J 27/00* | (2006.01) |
| *F25D 13/06* | (2006.01) |
| *F25D 17/06* | (2006.01) |
| *A47J 37/04* | (2006.01) |

(52) U.S. Cl.
CPC .............. *A23L 3/361* (2013.01); *A23L 5/17* (2016.08); *A47J 27/002* (2013.01); *A47J 37/045* (2013.01); *F25D 13/067* (2013.01); *F25D 17/06* (2013.01); *A23V 2002/00* (2013.01)

(58) Field of Classification Search
CPC .. A21B 1/48; A23L 3/361; A23L 5/17; A23V 2002/00; A47J 27/002; A47J 37/045; F25D 13/067; F25D 17/06; F25D 2317/063; F25D 2317/0664; F25D 2317/067; F25D 2317/0682; F25D 3/11
USPC .......................................................... 99/474
See application file for complete search history.

(56) References Cited

U.S. PATENT DOCUMENTS

| | | | |
|---|---|---|---|
| 2,093,270 | A | 9/1937 | Glinka |
| 4,953,365 | A | 9/1990 | Lang et al. |
| 5,020,330 | A | 6/1991 | Rhoades et al. |
| 5,243,962 | A | 9/1993 | Hwang |
| 5,343,714 | A | 9/1994 | Kiczek et al. |
| 5,343,715 | A * | 9/1994 | Lang ........................ A23L 3/361 |
| | | | 62/332 |
| 5,398,521 | A | 3/1995 | Baron et al. |
| 6,912,869 | B2 | 7/2005 | Lang |
| 7,748,234 | B2 | 7/2010 | Rhein |
| 8,333,087 | B2 | 12/2012 | McCormick et al. |
| 9,107,422 | B2 | 8/2015 | Howard et al. |
| 9,220,276 | B2 | 12/2015 | Howard |

(Continued)

FOREIGN PATENT DOCUMENTS

EP 2111112 A2 10/2009

*Primary Examiner* — Dana Ross
*Assistant Examiner* — Joseph W Iskra
(74) *Attorney, Agent, or Firm* — Donald T. Black

(57) ABSTRACT

The efficiency of a device for cooling or heating objects on a belt that moves through a path of a helix, in which gaseous cooling or heating medium is circulated within the device, is improved by positioning fans that circulate the cooling or heating medium so that the fans are distanced from the top of the helix.

9 Claims, 5 Drawing Sheets

(56) References Cited

U.S. PATENT DOCUMENTS

| | | | |
|---|---|---|---|
| 9,504,258 B1 | 11/2016 | Howard et al. | |
| 2002/0031582 A1* | 3/2002 | Perrine | A23L 3/10 |
| | | | 426/467 |

* cited by examiner

HELICAL DEVICE FOR COOLING OR HEATING

RELATED APPLICATIONS

This application claims the benefit of U.S. Provisional Application Ser. No. 62/683,301, filed on Jun. 11, 2018, which is incorporated herein by reference.

FIELD OF THE INVENTION

The present invention relates to devices useful for effecting rapid heat transfer to or from objects, such as the cooling and/or freezing or the heating and/or cooking of food or other products.

BACKGROUND OF THE INVENTION

Many industries, not least among them the food industry, find it necessary in the course of their operations to be able to cool or heat products relatively rapidly.

When a product needing chilling or freezing is at room temperature, or is at temperatures higher than room temperature as the result of a previous processing or cooking step, reducing the temperature of the product rapidly is desirable in order to minimize the ability of unwanted physical or chemical changes to occur. When the product is food, it is highly desirable to avoid enabling pathological organisms such as bacteria to grow on or in a product, and (particularly when the product is to be frozen), to put the product into condition to be packaged prior to its being stored and/or shipped to distributors or customers. Examples of products which benefit from this treatment, which are also products that can be treated by the present invention, include raw foods such as eggs, hamburger patties, fruits and vegetables, raw or cooked cuts of meat such as beef, pork, veal, lamb, poultry carcasses and poultry sections, as well as processed foods prepared by combining various ingredients, such as pastries, pre-packaged entrees and complete dinners.

When a product is to be heated or cooked, the ability to achieve the necessary heat transfer rapidly is useful in order to minimize the opportunity for pathogens to grow, and to achieve a greater rate of processing in a given period of time.

Many techniques are known for cooling and freezing large numbers of products such as food products. Examples include impingement coolers, mechanical refrigerators, and other devices wherein the product is conveyed through a chamber wherein the product is exposed to low temperatures for a sufficient period of time to reduce the temperature of the product to the desired final, cooled temperature.

Many techniques are also known for heating and cooking large numbers of products such as food products, such as tunnel ovens and the like. One preferred type of device applicable to cooling/freezing and heating/cooking applications is known as a spiral or helical cooler or cooker, wherein at least a portion of the path that the product follows as it is conveyed through a chamber is in the form of a helix. For example, the product is placed on a moving flexible belt that follows a path which curves around on itself as it steadily climbs. With this type of device, the product travels a longer distance and experiences a longer dwell time in the cooling or heating environment for a given amount of area occupied by the device, taking advantage of the vertical array of the belt.

Helical (also referred to as spiral) devices have heretofore presented a drawback that the successive tiers of the belt interfere with heat transfer from or to the product, because of the proximity of adjacent tiers which interfere with flow of cooling or heating air. Also, it has previously been considered necessary to include baffles and similar structure to guide the flow of the gaseous heat transfer medium within the unit, but the resulting tortuous path leads to loss of efficiency and loss of cooling capacity. The present invention provides devices and methods that retain the advantages of helical devices but which achieve faster heat transfer to or from the product than has been available up to now.

BRIEF SUMMARY OF THE INVENTION

One aspect of the present invention is a device useful for cooling or heating objects such as food products that pass through the device, comprising a housing having a bottom, top, and side walls, which create an enclosed space, and including first and second openings each of which is present through a side wall between the enclosed space and the exterior of the housing, an endless movable belt that extends between the first and second openings and that follows within the housing a path a portion of which is in the form of a helix which is oriented vertically around a vertical central space within the housing and includes a plurality of tiers of the belt that are arrayed vertically, outlets within the housing that are capable of dispensing heat transfer medium into the interior of the housing, a fan that is positioned in the vertical central space and that has blades oriented so as to be capable of impelling gaseous heat transfer medium vertically through the blades and capable of impelling movement of gaseous heat transfer medium across the tiers in the housing, wherein the fan is attached by a drive shaft to a motor that is capable of rotating the shaft and the fan, and wherein the fan is positioned in the vertical central space at a height such that at least one tier, and preferably a plurality of tiers, of the belt in the helix are located below the fan and at least one tier, and preferably a plurality of tiers, of the belt in the helix are located above the fan;

wherein there is circulation space within the housing between all of the exterior edges of the belt in the helix and the interior surfaces of the side walls, and between the topmost tier of the belt and the interior surface of the top wall, and there are openings between the vertical central space and the interior edges of the belt in the helix, so that gaseous heat transfer medium can be impelled by the fan across the upper surfaces of the tiers of the belt in the helix between the central space and the circulation space.

In alternate embodiments, there can be more than one such fan on the shaft.

In another aspect of the present invention, there is no structure present that would prevent flow of gaseous heat transfer medium between the central space and the upper surfaces of any tiers of the belt in the helix. In yet another aspect of the present invention, there is no structure present between the topmost tier of the belt in the housing and the top wall of the housing.

Another aspect of the present invention is a method for cooling or heating objects such as food products, comprising (A) providing a housing having (1) a bottom, top, and side walls, which create an enclosed space, and including first and second openings each of which is present through a side wall between the enclosed space and the exterior of the housing, (2) an endless movable belt that extends between the first and second openings and that follows within the housing a path a portion of which is in the form of a helix which is oriented vertically around a vertical central space within the housing and includes a plurality of tiers of the belt that are arrayed vertically, (3) outlets within the housing that are capable of dispensing heat transfer medium into the interior of the housing, and (4) circulation space within the housing between all of the exterior edges of the belt in the helix and the interior surfaces of the side walls, and between the topmost tier of the belt and the interior surface of the top wall, and there are openings between the vertical central space and the interior edges of the belt in the helix;
(B) operating a fan that is positioned in the vertical central space at a height such that at least one tier, and preferably a plurality of tiers, of the belt in the helix are located below the fan and at least one tier, and preferably a plurality of tiers, of the belt in the helix are located above the fan, and that has blades oriented so as to be capable of impelling gaseous heat transfer medium vertically through the blades and capable of impelling movement of gaseous transfer medium across the tiers in the housing, to cause gaseous heat transfer medium to flow from the circulation space to the central opening between adjacent tiers of the belt in the helix that are on one side of the fan, and to cause gaseous heat transfer medium to flow from the central opening to the circulation space between adjacent tiers of the belt in the helix that are on the other side of the fan; and
(C) moving the belt through the housing with objects on the belt while dispensing heat transfer medium into the interior of the housing that chills or heats the objects.

Preferred objects include food products, by which is meant edible products, whether packaged or not packaged. Other objects with which the invention may be useful include finished articles, raw metals and ores, powders, and medical products.

In a preferred embodiment of this method, gaseous heat transfer medium flows through all of the spaces between the central opening and the circulation space.

As used herein, "cooling" and its conjugate forms means removing heat from an article, and thus encompasses reducing the temperature of the article, freezing the article, or both reducing the temperature and freezing.

As used herein, "heating" and its conjugate forms means adding heat to an article, and thus encompasses increasing the temperature of the article, cooking the article, or both increasing the temperature and cooking.

As used herein, "vertical" means not only exactly perpendicular to the earth's surface but also within an angle of up to 30 degrees, preferably up to 10 degrees, relative to a line that is exactly perpendicular to the earth's surface.

DETAILED DESCRIPTION OF THE INVENTION

Figure 1:
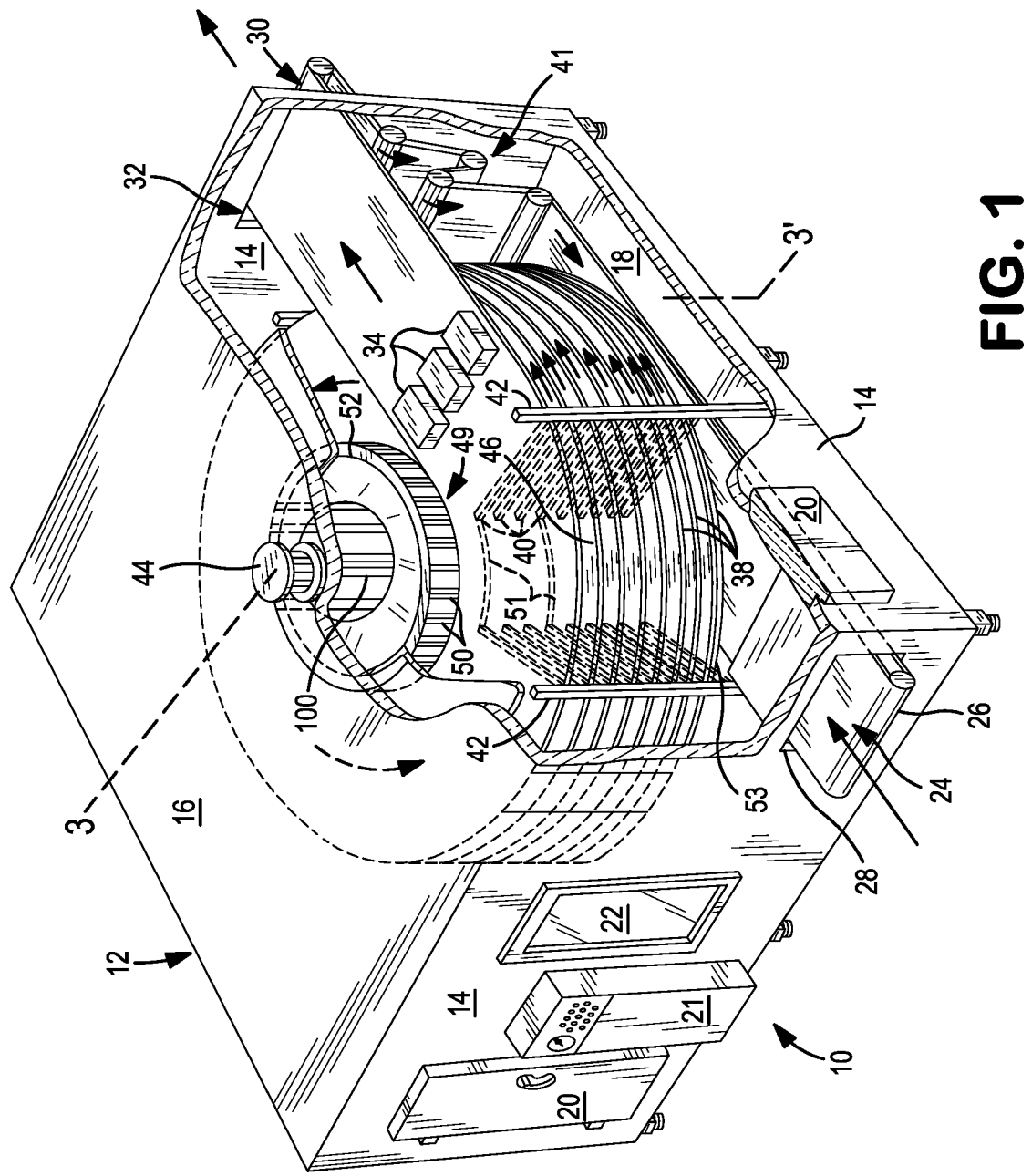
FIG. 1 is a perspective view in partial cutaway of a device with which the present invention is useful.

One embodiment of the type of device with which the present invention is useful appears in the drawing figures. However, these illustrations are provided for purposes of description and are not intended to limit the definition of this invention.

The device generally comprises unit 10 comprising an insulated housing 12, and an endless movable belt 24 that carries products 34 through housing 12. The device also comprises structure and components, not shown in FIG. 1, for cooling or heating the products as they pass through the housing 12.

Housing 12 can take the form of a rectangular parallelepiped having vertical walls 14, a top wall 16, and a bottom wall 18, all of which are preferably sealed together and thermally insulated against heat flow therethrough into or out of the interior of housing 12. One or more doors 20, and optional window 22, can be provided to permit physical and visual access to the interior. Control panel 21, containing controls such as for the operation of the belt, fan, and any cooling or heating unit associated with the device, and conveniently also containing gauges for monitoring the conditions of the unit, can also be provided on the exterior of a wall 14.

The products to be cooled or heated are preferably conveyed on endless belt 24 which can be of known construction. The belt is preferably porous enough to permit air to flow through it. Examples include belts of unitary material such as a polymeric web of material, and belts of interlocked links of polymeric or metallic material which can flex and change their position relative to adjacent links so as to accommodate the belt being able to pass through the straight and curved portions of the belt's route. Material that serves as gaseous heat transfer medium described herein (such as chilled air, or cryogenic vapor) passes through open spaces between the links of this type of belt.

Loading (or unloading) station 26 is preferably provided adjacent to a first opening 28 through one wall 14, and an unloading (or loading) station 30 outside a second opening 32 through the same or another wall 14 is also provided. With these stations and openings, product can be fed into and recovered from the unit 10 without the operator needing to enter the unit. The belt 24 extends between first opening 28 and second opening 30, by which is meant that a product can be placed onto belt 24 at one of said openings and removed from belt 24 at the other of said openings, from outside unit 10. The many ways that products can be placed onto belt 24 include placing product onto belt 24 by hand, or by positioning another conveyor outside the unit so that products can move off the end of the conveyor onto belt 24. Similarly, products can be removed from belt 24 by hand, or by being moved off of belt 24 onto another conveyor outside the unit. Thus, the belt 24 can extend from the interior of the housing 12 through openings 28 and 32 to outside the housing, as shown in FIG. 1, but does not need to.

As shown in FIG. 1, one of the openings 28 and 32 is located at a relatively low elevation, such as at about the same level as the lower end of the helix formed by the belt, and the other of these openings is at a relatively high level at the upper end of the helix. Product can pass from low to high, as indicated by the arrows in FIG. 1, or from high to low. A small number of products 34 are shown in FIG. 1, for purposes of illustration, but in actual practice the belt could be carrying a much higher number of products.

The belt 24 is driven through its path in any manner by suitable equipment. A preferred type of equipment employs a cylindrical cage 49 which typically comprises a plurality of vertical bars 50 which are spaced apart from each so that gaseous heat transfer medium can flow between the bars. The bars 50 are arrayed in the form of a cylinder and are attached to circular rolled angles at the top (shown as 52) and the bottom (shown as 53)) and located around the outermost circumference of central space 104 (see also FIG. 2) within the helix formed by the helical portion of the belt. The outer surfaces of the bars 50 of cage 49 frictionally engage the interior edges 24A of the belt 24 in the helix. The cage 49 is rotated about its longitudinal (vertical) axis via a motor 54 which is connected by suitable linkage to the cage, and the rotation of the cage frictionally engages the belt and causes the belt to move through its path. A fuller description of this type of equipment appears in U.S. Pat. No. 4,953,365.

The belt 24 can alternatively be moved through its path by any other suitable equipment, such as the combination of a roller or pulley over which the belt passes and that engages the belt (such as by friction or by engagement of teeth on the roller with the belt material), and a motor and suitable connecting linkage by which the motor turns the roller or pulley and thereby causes the belt to move.

The path of belt 24 as shown in FIG. 1 extends within the housing 12 between first opening 28 and then upward about a generally helical path thereby defining a plurality of tiers 38 and defining spaces 46 between each pair of adjacent tiers 38. The tiers 38 are supported by a plurality of horizontal arms 40 which extend inward transversely and preferably radially inward from posts 42 that extend between top wall 16 and bottom wall 18. Circumferential support beams (some of which are shown as 51 and 53) are attached to the inner and outer ends, respectively, of the arms 40, and have curvature corresponding to that of the inner and outer edges of the belt 24 so that the inner and outer edges of the belt are supported by and slide on the upper surfaces of support beams 51 and 53. Other arrangements for structure that supports the belt and permits it to move are also known and can be employed, so long as they support the belt in the desired path and permit it to move along the path (such as with the aid of rollers or roller bars on the arms 40). A suitable tensioning mechanism can be provided, such as is shown at 41, to help the belt to be sufficiently taut regardless of changes in its length caused by temperature differentials.

Figure 2:
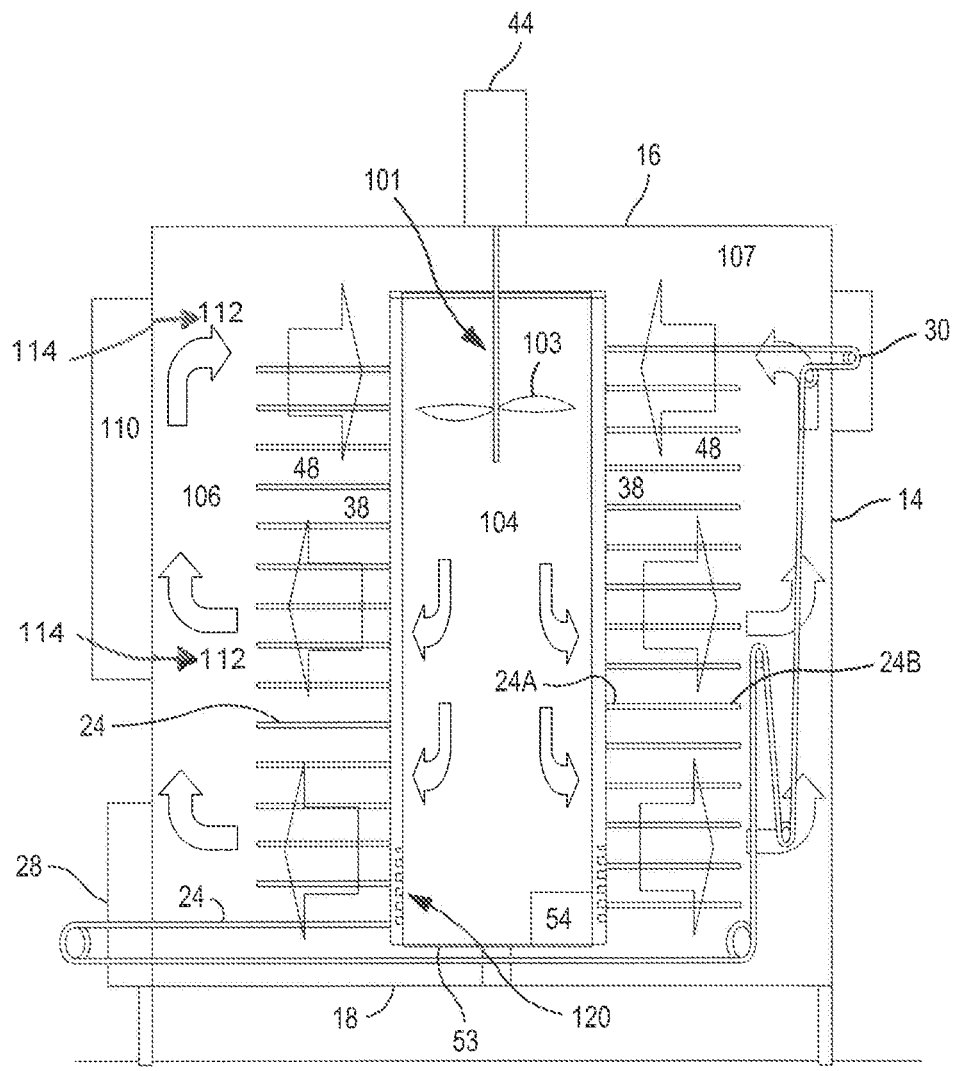
FIG. 2 is a cross-sectional view of an embodiment of the device of FIG. 1.
Figure 3:
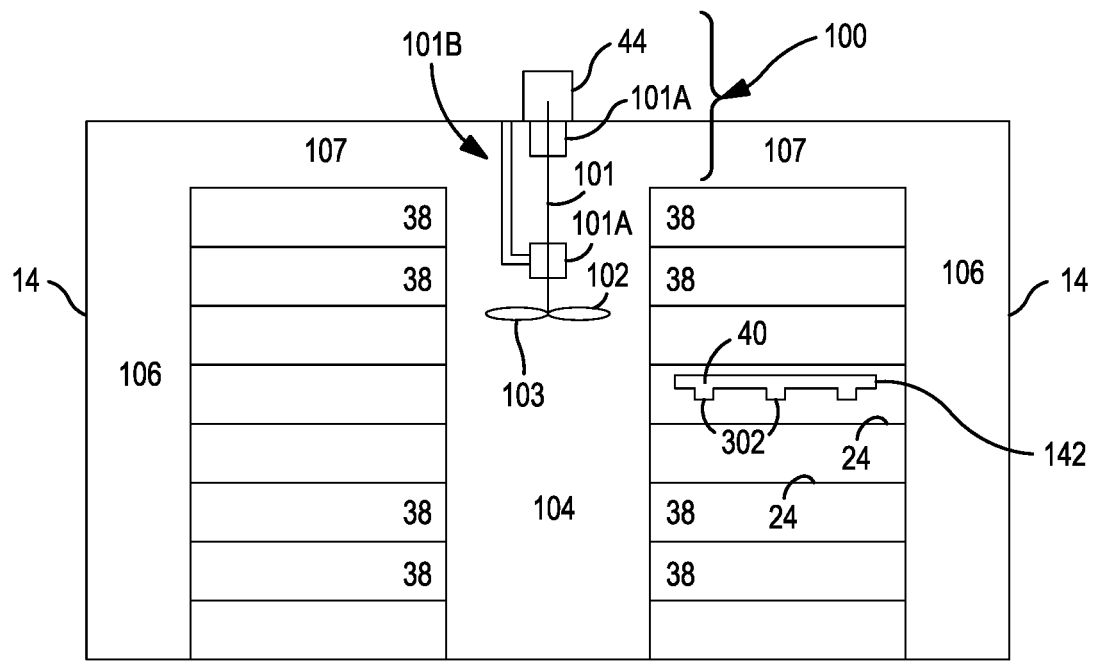
FIG. 3 is a cross-sectional view of the embodiment of the invention of FIG. 1 taken on line 3-3' of FIG. 1.

Referring also to FIG. 2, the housing 12 is dimensioned to provide lateral circulation spaces 106 between the exterior edges 24B of the belt 24 in the helix and the interior surfaces of walls 14. The housing is furthermore dimensioned to provide top circulation space 107 between the topmost tier of the belt and the interior surface of top wall 16.

The gaseous heat transfer medium is often air. For cooling purposes, the invention can be practiced using chilled air, or injected cryogen such as liquid nitrogen or liquid carbon dioxide, as discussed below. For heating purposes, air can be used as the heat transfer medium, as can other heat-carrying substances such as steam. The present invention will be described first with reference to cooling using air.

There are several ways that can be employed to cool air for use in the practice of the present invention. In the embodiment of the invention shown in FIG. 2, the air within housing 12 is cooled by cooler 110. Cooler 110 comprises any conventional heat exchange device by which cooling fluid 112, such as air, passes through cooler 110 and is fed from outlets 114 into housing 12 after having been chilled in cooler 110 via indirect heat exchange by coming into contact with piping or other surfaces which are colder than the fluid entering into cooler 110. One preferred technique is to contact the air with piping that contains mixed carbon dioxide-ammonia refrigerant, which is generally at minus 62 degrees F. to minus 63 degrees F., so that the air is chilled to about minus 52 degrees F. to minus 53 degrees F. Another preferred technique is to use as the refrigerant a multicomponent refrigerant such as disclosed in U.S. Pat. No. 6,176,102, which permits the cooling surfaces to have a temperature even as low as about minus 140 degrees F. so that the air can be chilled to about minus 125 degrees F.

Another technique to provide cooling to product in the device of this invention is to use liquid cryogen such as liquid nitrogen or liquid carbon dioxide, which are of course very cold before and after they evaporate. Referring to FIGS. 3 through 6, liquid cryogen is fed under pressure into the interior of housing 12 via line 192 and is sprayed onto products on belt 24. Vaporization of the injected cryogen withdraws heat and provides a very cold gaseous heat transfer medium. Thus, when cryogen vapor is employed as the cooling medium, cooler 110 is not needed.

Referring to FIGS. 3, 4, 5A and 5B, (in which, for purposes of clarity, not all features of the invention may be shown in every Figure) in one preferred mode of spraying the cryogen one or more of the arms 40 are hollow and have on the underside a plurality of nozzles 302 which discharge toward the belt 24. Line 192 from outside housing 12 is connected to opening 304 in the end of each arm 40 that is so constructed, and cryogen fed into opening 304 emerges under pressure from nozzles 302 toward and onto the belt and onto product 34 that is on the belt. Line 192 is connected outside housing 12 to a tank or other suitable source of cryogen under pressure.

If the operator observes that the rate of heat transfer (or the extent of chilling or freezing) to a belt surface is higher nearer to an interior edge 24A and less nearer to an exterior edge 24B, then the flows of heat transfer medium out of nozzles 302 can be varied so that the flow from the nozzles nearer to edge 24A is less than the flow from the nozzles nearer to edge 24B. Flows can be varied by using nozzles with different sized openings.

In embodiments in which products on the belt are to be heated, the embodiment in FIG. 2 can be employed in which cooler 110 is replaced by an air heater which is a source of heated air that serves as the heat transfer medium which is circulated and impinged upon the product. Alternatively, the arrangement in FIGS. 3 through 6 can be employed in which line 192 feeds steam from a source such as a steam generator, or another high-temperature fluid from a suitable source thereof, through opening 304 into arms 40 and out nozzles 302. The thus ejected steam or other fluid performs as a hot heat transfer medium.

Figure 4:
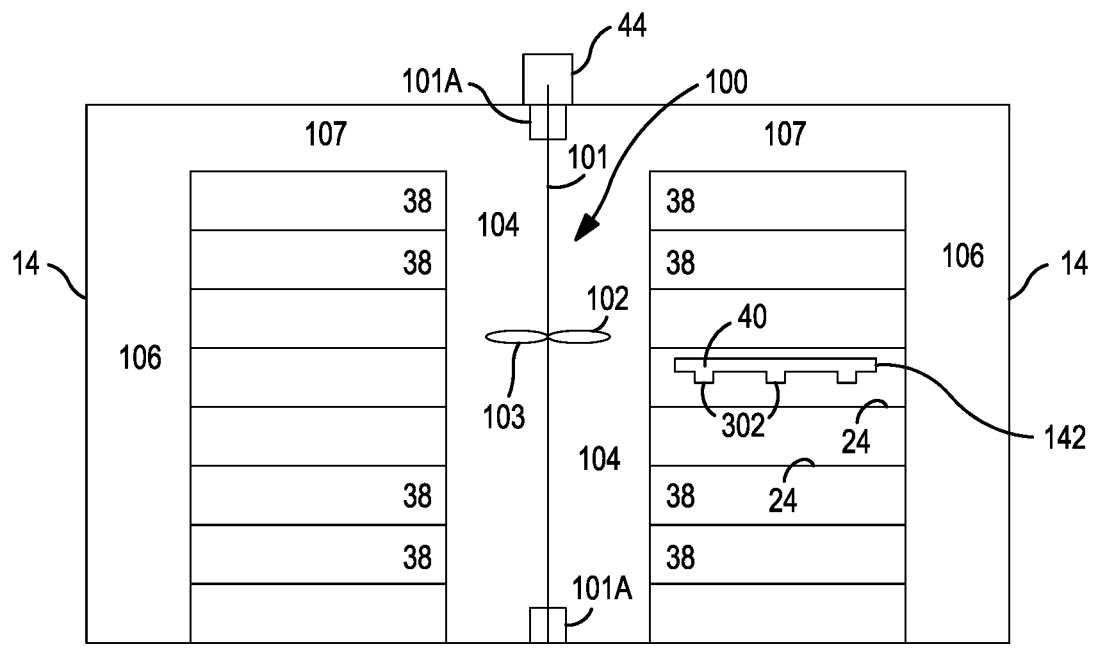
FIG. 4 is a cross-sectional view of another embodiment of the invention.

In any of the embodiments of the present invention, an impeller 100 is present to provide convective heating or cooling. Impeller 102 is positioned in central space 104 and includes shaft 101 which is attached to motor 44 that, when operating, rotates shaft 101. While motor 44 is shown in the Figures as located on top wall 16, the motor 44 that rotates shaft 101 can be situated elsewhere in the unit and connected via suitable linkages so that operation of the motor 44 causes shaft 101 to rotate. Shaft 101 can extend downward from top wall 16, which is also its preferred point of attachment to motor 44 as shown in FIGS. 2, 3, 4, 5A and 5B. As can be seen in FIGS. 2, 3, 5A and 5B, shaft 101 can extend downward from top wall 16 part of the distance toward bottom wall 18, so that the lower end of shaft 101 is between top wall 16 and bottom wall 18. However, if desired, as can be seen in FIG. 4, shaft 101 can extend all the way from top wall 16 to bottom wall 18. In either embodiment, it is preferred to provide one or more bearings 101A which are secured to a wall of the housing 12, such as top wall 16 and/or bottom wall 18, and/or to structure that is in turn attached to top wall 16 or bottom wall 18 (such as arm 101B that appears in FIG. 3). Any such bearings should permit the shaft to rotate freely within each bearing, and would hold the shaft 101 in its axial position to restrain it from deviating from its desired axial position while it rotates.

One or more fans 102 are attached to shaft 101. Each fan 102 contains one or more blades 103. The fans 102 and blades 103 are fixed in position so that rotation of shaft 101 causes each fan and its blades to rotate about the axis of shaft 101. The blades of each fan 102 (or of one fan 102 when only one fan is present) should be angled to drive gaseous atmosphere in a vertical direction from the blades, which is upwards or downwards depending on the direction of rotation of shaft 101.

The diameter of the blades 103 inside the central space 104 must of course provide a large enough gap to safely be rotated without the tips of the blades hitting the interior belt edges 24A or the inside surfaces of the cage bars for all conditions and bearing locations. The gap between the tip of each blade 103 and the belt edges 24A, or the cage bars, whichever is closer to shaft 101, is typically 1 inch or more. This allows for safe operation of the impeller 100 during operation, even when ice may have built up on the blades 103 which could change the effective length of a blade 103 or could cause vibration because of the extra weight that would be caused by the ice. Shorter blade diameters, even presenting a gap of up to about 6 inches between the blade tip and the vertical bars of the cage, have been tested successfully running at higher rotational speed to provide the same volumetric flow rate of atmosphere through space 104.

Each fan 102 is positioned in central space 104 between the topmost and bottommost tiers 38 of the belt 24 in the helix. When there is one fan 102 present, one tier 38 (as shown in FIG. 2) or a plurality of tiers 38 (one example of which is shown in FIG. 4) of the belt 24 are above the plane of fan 102, and one tier 38 or a plurality of tiers 38 are below the plane of fan 102. By "plane of the fan" is meant the horizontal plane, perpendicular to shaft 101, in which the radial axes of the blades 103 lie. In embodiments wherein more than one fan is present, such as the embodiments of FIGS. 5A and 5B in which fans 102A and 102B are present, one tier 38 or a plurality of tiers 38 of the belt 24 are above the plane of the fan that is closest to the top wall 16, and one tier 38 or a plurality of tiers 38 of belt 24 are below the plane of the fan that is closest to the bottom wall 18, and there should also be a plurality of tiers 38 between the planes of the two fans. More than two fans may be provided on shaft 101, up to four or five, but one or two fans are adequate to provide the improved flow and the improved efficiency that are realized with this invention. Alternatively, as shown in FIG. 5B, fan 102A is attached to shaft 101 which is driven by motor 44, whereas fan 102B is attached to another shaft 101B which is driven by motor 44B.

Rotation of the fan or fans causes gaseous atmosphere on one side of each of the one or more fans 102 to be drawn across belt surfaces 24 on each tier from the circulation space 106 into the central space 104, while causing gaseous atmosphere on the other side of the fan to be forced across belt surfaces on each tier from the central space 104 to the circulation space 106. As the gaseous atmosphere is drawn or forced across each belt surface, the atmosphere contacts the objects (such as food products) that are on each such belt surface and cools them (or heats them, depending on the intended function of the apparatus and on the temperature of the heat transfer medium relative to the products 34). It will be understood that whereas the gaseous atmosphere flows in an essentially vertical direction as it passes through the plane of the blades 103, the flow of the atmosphere toward the blades and away from the blades will be not just vertical but also out of the spaces 46 between each tier 38 of the belt 24 in the helix on the upstream side of the fan, and into the spaces 46 between each tier 38 of the belt in the helix on the downstream side of the fan. Of course, the blades are "pitched" by which is meant that the blades as attached to the fan lie in a plane that is not horizontal and not vertical but is at an angle relative to the horizontal plane containing the radius of the blade.

One flow pattern is illustrated by the large arrows in FIG. 2. In this embodiment, the combination of the direction of rotation of shaft 101 and the direction in which fan blades 103 are pitched causes the heat transfer medium to be drawn from circulation spaces 106 into and through the spaces 38 between the tiers of belt 24 that are above the plane of fan 102 (thereby passing across the surfaces of belt 24 in those spaces and contacting product 34 that is on those surfaces) as well as through top circulation space 107, into space 104 above fan 102, then forced downward through fan 102 and into and through the spaces 38 between across the tiers of belt 24 that are below the plane of fan 102 (thereby passing across the surfaces of belt 24 in those spaces and contacting product 34 that is on those surfaces), and then into the circulation spaces 106.

It will be recognized that the direction of flow shown in FIG. 2 can be reversed, if the direction of rotation of shaft 101 is reversed or if the blades 103 are pitched in the other direction. Then, the heat transfer medium would be drawn from circulation spaces 106 into and through the spaces 38 between the tiers of belt 24 that are below the plane of fan 102 (thereby passing across the surfaces of belt 24 in those spaces and contacting product 34 that is on those surfaces), into space 104, then forced upward through fan 102 and into and through the spaces 38 across the tiers of belt 24 that are above the plane of fan 102 (thereby passing across the surfaces of belt 24 in those spaces and contacting product 34 that is on those surfaces), as well as through top circulation space 107, and then into the circulation spaces 106.

The positioning of the fan 102 (or multiple fans) can advantageously be established by reference to the Vertical Stack Length, which is defined as the vertical distance between the point at which the belt enters the housing and the vertical distance between the point at which the belt exits the housing. The bottom position of the fan blades 103 should be a distance that is at minimum about 10% of the Vertical Stack Length below the level at which the belt exits and that is at maximum about 50% of the of the Vertical Stack Length below the top of the belt stack. Optimally this fan position should be a distance of between 20% and 40% of the Vertical Stack Length below the level at which the belt exits the housing. At distances below the level at which the belt exits the housing of less than 20% of the Vertical Stack Length, the fan is so close to the top of the apparatus that there can be high velocities and high pressure drops on the inlet that lower the performance and flow rate of the fan, which can reduce the heat transfer and freezing or heating capacity of the apparatus. At distances below the level at which the belt exits the housing of more than 50% of the Vertical Stack Length, the shaft that is driving the fan can become long enough that it can become difficult to stabilize at the high rotational speeds that are required to produce high velocities and flow rates across the tiers.

The positioning of the fan as described herein enables the user to operate without any baffles or other structure, above the topmost tier of the belt other than the top wall itself, that would completely block flow of gaseous heat transfer medium between the topmost tier of the belt and the top wall of the housing. The positioning of the fan as described herein also enables the user to operate without any baffles or other structure that would prevent the gaseous atmosphere from passing in either direction into or out of the space between tiers of the helix, between circulation space 106 and central space 104. However, the user may find it advantageous to include a modified baffle 120 in the region of central space 104 that extends from the lowest tier of belt 24 as far upward as 10 to 15% of the distance from the lowest tier of belt 24 to the inside surface of top wall 16 of the housing. Typically this modified baffle 120 extends across the openings between space 104 and the bottom 1 to 3 tiers of the helix. Such a baffle should be perforate, that is, not completely impermeable but having openings (holes or slots) through it to permit some gaseous atmosphere to pass through it. This is advisable to reduce the velocity of the atmosphere across the lowest tiers of the belt in the helix when the product on the belt is relatively light, while still permitting heat transfer medium to flow across the tiers and contact products on those tiers.

Figure 5A:
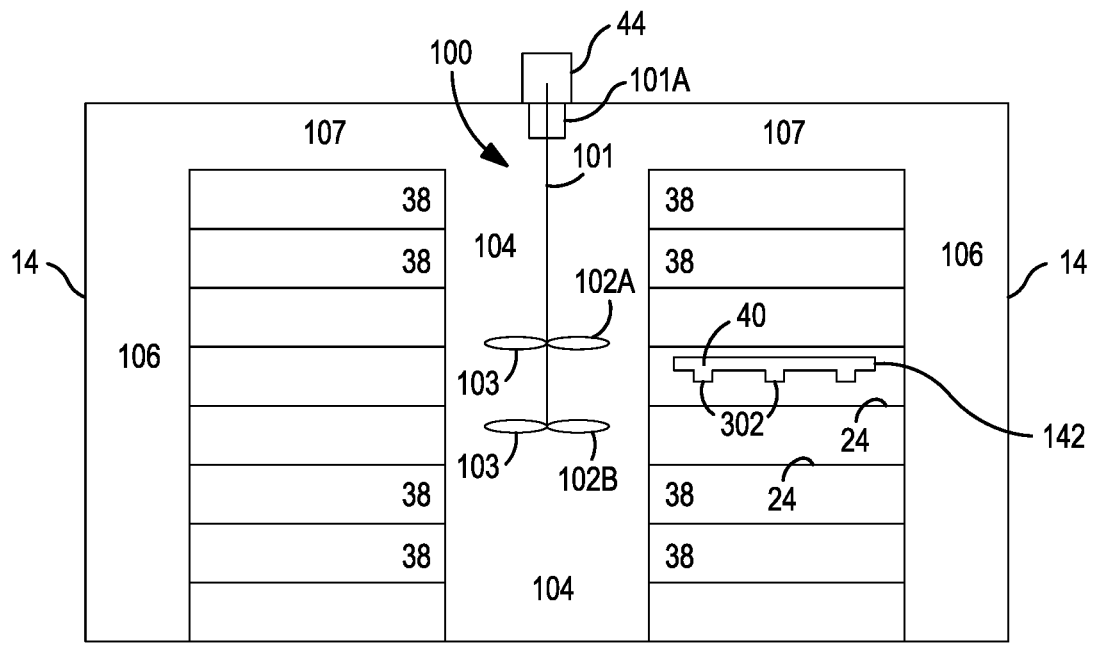
FIGS. 5A and 5B are cross-sectional views of embodiments of the invention employing two fans.
Figure 5B:
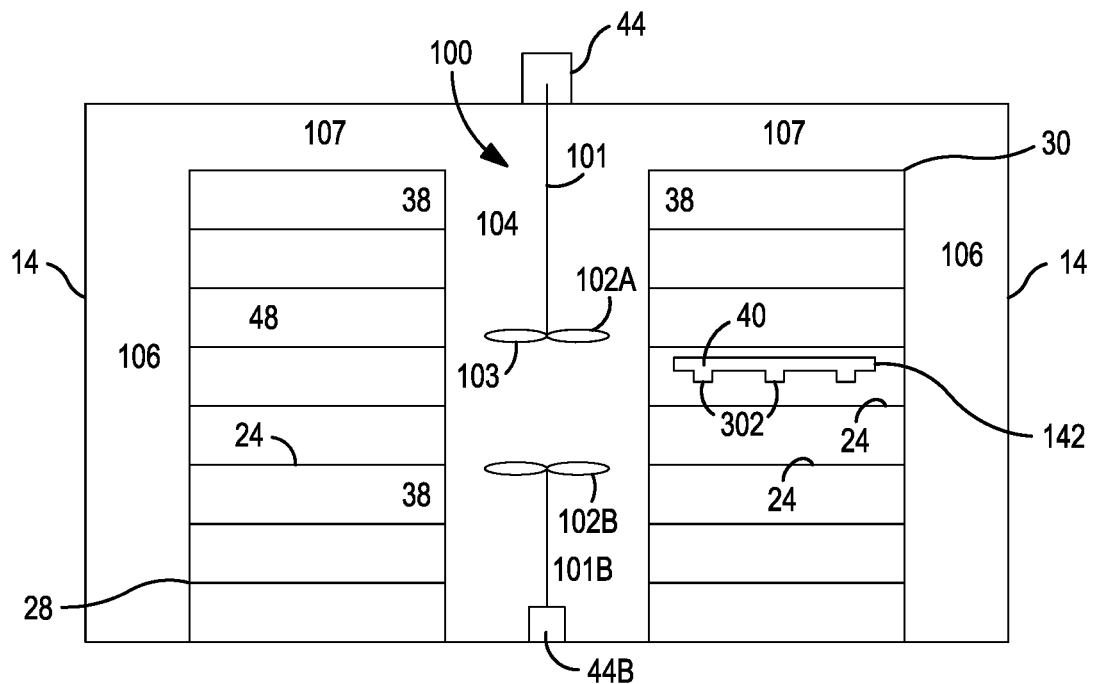
Figure 6:
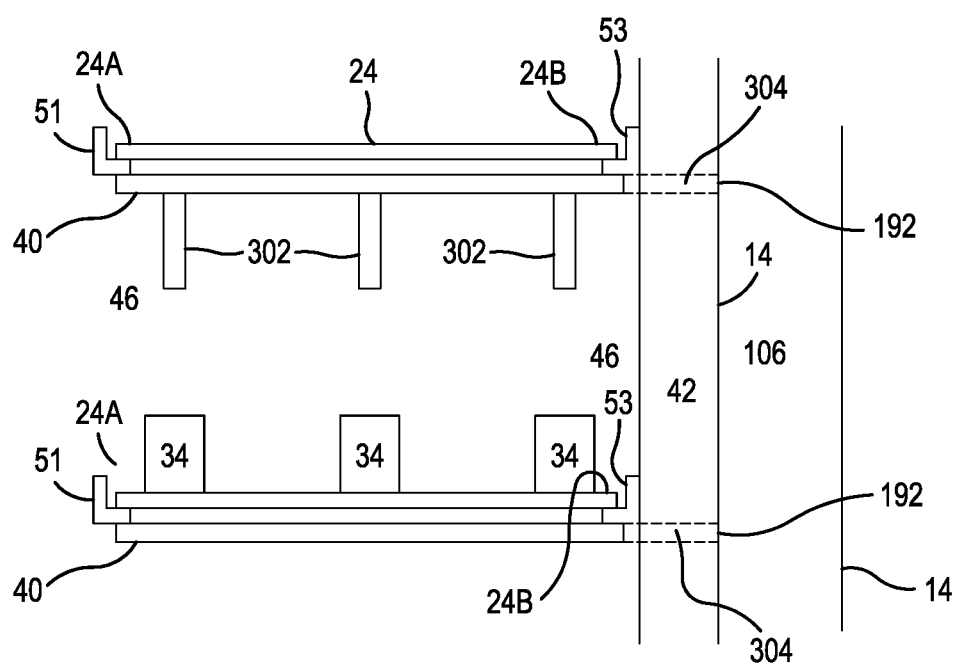
FIG. 6 is an expanded view of part of the embodiment of FIG. 3.

In the embodiments of FIGS. 5A and 5B, the blades of the two fans 102A and 102B are preferably pitched in opposing directions, although this is not absolutely necessary. When the blades are pitched in opposing directions, then rotation of shaft 101 in one direction will cause the heat transfer medium to be drawn from circulation spaces 106 into and through the spaces 38 between the tiers of belt 24 that are above the plane of the fan 102B that is positioned lower on shaft 101 and below the plane of fan 102A that is positioned higher on shaft 101 (thereby passing across the surfaces of belt 24 in those spaces and contacting product 34 that is on those surfaces), into the region of space 104 that is between the fans, then forced upward through fan 102A and downward through fan 102B, and into and through the spaces 38 across the tiers of belt 24 that are above the plane of fan 102A (thereby passing across the surfaces of belt 24 in those spaces and contacting product 34 that is on those surfaces), as well as through top circulation space 107, and into and through the spaces 38 across the tiers of belt 24 that are below the plane of fan 102B (thereby passing across the surfaces of belt 24 in those spaces and contacting product 34 that is on those surfaces), and then into the circulation spaces 106.

If the shaft 101 is rotated in the opposite direction, then the directions of these flows would be reversed. That is, the gaseous heat transfer medium would be drawn from circulation spaces 106 that are above the plane of fan 102A and those that are below the plane of fan 102B, across the tiers of belt 24 into space 104 above and below the respective fans, then through fans 102A and 102B into the region of space 104 that is between the planes of fans 102A and 102B, and then across the tiers that are between the planes of those fans, into circulation spaces 106.

Where two fans 102A and 102B are present and their blades are pitched in the same direction, the overall flow pattern will resemble that of FIG. 2, in either of two overall patterns: with flow passing from spaces 106, across the tiers that are above the plane of the higher fan 102A and into space 104 above the plane of fan 102A, then through fan 102A and across the tiers that are below the plane of fan 102A and into spaces 106; or with flow passing from spaces 106, across the tiers that are below the plane of the lower fan 102B and into space 104 below the plane of fan 102B, then through fan 102B and across the tiers that are above the plane of fan 102B and into spaces 106.

There are significant variations in the vapor velocities over the product in a radial flow helical device depending on the location within the enclosure. A series of measurements were made at different positions on the belt (inside edge to outside edge) and different tier heights within the helix. The airflow measurements in radial flow helical freezers with a fan only at the very top of the belt stack indicate that a global average velocity across all tiers of about 325 feet per minute is achieved. When the fan is in a position according to the present invention and the top and bottom flow baffles are removed, the global average velocity measured is raised to 829 feet per minute. This represents a factor of a 2.55 increase in the velocity of cooling or heating medium over the products on the belt, and produces a freezer with much higher capacity for freezing or chilling.

Computational fluid dynamics (CFD) modeling of the helical freezer geometry with both the current radial airflow and the improved radial airflow also indicate a much higher average velocity is achieved with the lower fan position. The lower velocities on the inlet of the fan a particularly important to decreasing the pressure drop across the fan and increasing the flow through the fan.

The device of the present invention has numerous advantages relative to previous designs. Compared to other radial flow freezers, the new vapor flow pattern is more efficient with a lower pressure drop that enables lower power to drive the fan, a higher fan capacity, and higher velocities. Higher average vapor velocity on the belt surface drives higher levels of convection cooling. This increased rate of convection enables a higher freezing (or cooking) capacity in lb/hr in the same available space due to the better airflow. Other radial flow devices include top baffles to direct the flow where it is needed, but no top baffles are needed for the new flow design of the present invention.

Compared to freezers that employ horizontal flow of the cooling medium, the present invention provides higher average velocity for a lower power input. Also, the present invention does not require a solid center cage or additional baffles to force flow across the belt surface. All flow on both the inlet and outlet side of the fan produces velocity across the belt, so there is minimal wasted velocity that does not pass over the product.

Compared to freezers that employ vertical flow of the cooling medium, the present invention requires much lower power input to produce high gas velocities across the belt. The added expense and complexity of closing off the belt edges and cage to flow is not required with the improved flow path of the present invention.

Other advantages of the present invention include higher capacity and smaller equipment size. As the convection cooling is significantly enhanced, a smaller lower cost freezer will be required for many users. The absence of any required flow-directing baffles opens up the freezer to both better airflow and easier sanitation of the equipment at the end of the production shift. Additional advantages of the present invention include lower operating cost per pound of production; lower power requirements and higher capacity drive a lower cost of operation per unit of capacity. The advantages of the present invention are especially pronounced for cryogenically cooled freezers.

The location of the fan according to the present invention is between sections of the flow resistance. This allows the flow of gaseous heat transfer medium on the tiers above the fan position to be driven by the suction into the fan and the flow on the tiers below the fan position to be driven by the positive pressure output of the fan. As a result, there is little or no wasted velocity produced.

Dividing the flow resistance into two sections (above and below the fan) lowers the flow resistance in each section and products higher velocities. The lower flow resistance results in lower pressure drop, which produces much higher gas flow rates and velocities across the product on the belt with the same power consumed in producing the flow of the gas.

The overall circuit length of the flows of the gaseous heat transfer medium is minimized which maximizes the velocity across the belt for a given horsepower of used to create the gas flow. When the outlet of the fan pushes the flow at high velocities across the belt inside to outside below the fan blade, the inlet of the fan pulls the flow at high velocity from outside to inside across the belt positioned above the fan blade.

Also, the present invention employs a much larger effective inlet flow area to the fan, that reduces pressure drop on the inlet to the fan.

The device of the present invention can be used to cool, freeze, or form a frozen crusted outer surface, on products that are at room temperature or that are cooler or warmer than room temperature, especially including products that have just been cooked or have just been cut from freshly slaughtered animals. It can be used to warm or cook objects that enter at room temperature or at temperatures higher or lower than room temperature, especially including products that are fresh or have been stored in chilled or frozen conditions.

The device of the present invention affords numerous advantages. The principal advantage is a much higher rate of heat transfer from the product relative to the amount of cryogen employed. This advantage leads to several other advantages: for a given size of device, more product can be cooled or heated, and/or product can be cooled (or heated) to a lower (or higher) temperature; a given amount of cooling or heating can be achieved in a much shorter period of time; and a given amount of product can be cooled or heated more quickly in a smaller unit than heretofore needed.

In particular, when this invention is used to freeze at least the outer surface of a product, the product retains a greater proportion of its internal moisture compared to freezing using previously known devices, because other freezing regimens permit a greater amount of that moisture to be lost from the product before a frozen outer layer forms that prevents further moisture loss. The more rapid cooling and freezing and this invention provides establishes that frozen outer layer much more quickly, thereby retaining more of the internal moisture. This advantage is especially useful when the product being treated is warm and/or moist, such as freshly produced raw-meat, freshly cooked meat, and freshly steamed or cooked vegetables.

What is claimed is:

1. A device for cooling or heating objects that pass through the device, comprising
    a housing having a bottom, top, and side walls, which create an enclosed space, and including first and second openings each of which is present through a side wall between the enclosed space and the exterior of the housing,
    an endless movable belt that extends between the first and second openings and that follows within the housing a path a portion of which is in the form of a helix which is oriented vertically around a vertical central space within the housing and includes a plurality of tiers of the belt that are arrayed vertically,
    outlets within the housing that are capable of dispensing gaseous heat transfer medium into the interior of the housing,
    one or more than one fan that is positioned in the vertical central space and that has blades oriented so as to be capable of impelling gaseous heat transfer medium vertically through the blades and capable of impelling movement of gaseous heat transfer medium across the tiers in the housing,
    wherein the one or more than one fan is attached by a drive shaft to a motor that is capable of rotating the shaft and the fan, and wherein the fan is positioned in the vertical central space at a height such that at least one tier of the belt in the helix is located below the plane of the fan and at least one tier of the belt in the helix is located above the plane of the fan;
    wherein there is circulation space within the housing between all of the exterior edges of the belt in the helix and the interior surfaces of the side walls, and between the topmost tier of the belt and the interior surface of the top wall, and there are openings between the vertical central space and the interior edges of the belt in the helix, so that rotation of the fan or fans causes gaseous heat transfer medium on one side of the fan or fans to be drawn across the upper surfaces of each tier of the belt in the helix from the circulation space into the central space, and causes gaseous heat transfer medium on the other side of the fan or fans to be forced across the upper surfaces of each tier of the belt in the helix from the central space into the circulation space.

2. A device according to claim 1 wherein there is one such fan that is positioned in the vertical central space.

3. A device according to claim 1 wherein there is no structure present above the fan that would impede flow of gaseous heat transfer medium between the central space and the top surfaces of the tiers of the belt in the helix.

4. A device according to claim 1 wherein there is no structure present that would prevent flow of gaseous heat transfer medium between the topmost tier of the belt in the housing and the top wall of the housing.

5. A device according to claim 2 wherein there is no structure present above the fan that would impede flow of gaseous heat transfer medium between the central space and the top surfaces of the tiers of the belt in the helix.

6. A device according to claim 2 wherein there is no structure present that would prevent flow of gaseous heat transfer medium between the topmost tier of the belt in the housing and the top wall of the housing.

7. A device for cooling or heating objects that pass through the device, comprising
    a housing having a bottom, top, and side walls, which create an enclosed space, and including first and second openings each of which is present through a side wall between the enclosed space and the exterior of the housing,
    an endless movable belt that extends between the first and second openings and that follows within the housing a path a portion of which is in the form of a helix which is oriented vertically around a vertical central space within the housing and includes a plurality of tiers of the belt that are arrayed vertically,
    outlets within the housing that are capable of dispensing gaseous heat transfer medium into the interior of the housing,
    two fans that are positioned in the vertical central space and that have blades oriented so as to be capable of impelling gaseous heat transfer medium vertically through the blades and capable of impelling movement of gaseous heat transfer medium across the tiers in the housing, wherein the fans are attached one above the other to a common drive shaft that is attached to a motor that is capable of rotating the shaft and the fans, or to separate drive shafts each attached to a motor that is capable of rotating the shaft and the fan, and wherein the fans are positioned in the vertical central space at heights such that at least one tier of the belt in the helix is located above the plane of the higher fan, and at least one tier of the belt in the helix is located below the plane of the lower fan, and a plurality of tiers of the belt in the helix are located between the planes of the fans;

wherein there is circulation space within the housing between all of the exterior edges of the belt in the helix and the interior surfaces of the side walls, and between the topmost tier of the belt and the interior surface of the top wall, and there are openings between the vertical central space and the interior edges of the belt in the helix, so that rotation of the fans causes gaseous heat transfer medium on one side of the fans to be drawn across the upper surfaces of each tier of the belt in the helix from the circulation space into the central space, and causes gaseous heat transfer medium on the other side of the fans to be forced across the upper surfaces of each tier of the belt in the helix from the central space into the circulation space.

8. A device according to claim 7 wherein there is no structure present above the fan that would impede flow of gaseous heat transfer medium between the central space and the top surfaces of the tiers of the belt in the helix.

9. A device according to claim 7 wherein there is no structure present that would prevent flow of gaseous heat transfer medium between the topmost tier of the belt in the housing and the top wall of the housing.

* * * * *